US012624430B2

(12) United States Patent
Nakano

(10) Patent No.: US 12,624,430 B2
(45) Date of Patent: *May 12, 2026

(54) IRON ALLOY PARTICLE AND METHOD FOR PRODUCING IRON ALLOY PARTICLE

(71) Applicant: Murata Manufacturing Co., Ltd., Kyoto-fu (JP)

(72) Inventor: Manabu Nakano, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 481 days.

This patent is subject to a terminal disclaimer.

(21) Appl. No.: 18/297,335

(22) Filed: Apr. 7, 2023

(65) Prior Publication Data

US 2023/0304134 A1 Sep. 28, 2023

Related U.S. Application Data

(60) Division of application No. 17/017,478, filed on Sep. 10, 2020, now Pat. No. 11,649,533, which is a
(Continued)

(30) Foreign Application Priority Data

Mar. 23, 2018 (JP) ................................ 2018-056447

(51) Int. Cl.
*B22F 9/04* (2006.01)
*B22F 1/054* (2022.01)
(Continued)

(52) U.S. Cl.
CPC ................ *C22C 38/16* (2013.01); *B22F 1/08* (2022.01); *B22F 9/04* (2013.01); *C22C 38/002* (2013.01); *C22C 38/02* (2013.01); *C22C 45/02* (2013.01); *H01F 1/15341* (2013.01); *B22F 1/054* (2022.01); *B22F 1/07* (2022.01); *B22F 2009/048* (2013.01); *B22F 2301/35* (2013.01);
(Continued)

(58) Field of Classification Search
None
See application file for complete search history.

(56) References Cited

U.S. PATENT DOCUMENTS 11,939,652 B2 * 3/2024 Nakano .................. C22C 38/00
2009/0266448 A1 10/2009 Ohta et al.

FOREIGN PATENT DOCUMENTS

CN 101263240 A 9/2008
JP 2007-107094 A 4/2007
(Continued)

OTHER PUBLICATIONS

Machine translation of JP2008-294411A. (Year: 2008).*
(Continued)

*Primary Examiner* — Xiaowei Su
(74) *Attorney, Agent, or Firm* — Studebaker Brackett PLLC

(57) ABSTRACT

The iron alloy particle is a particle including an iron alloy. The particle includes multiple mixed-phase particles, each including nanocrystals of 10 nm or more and 100 nm or less (i.e., from 10 nm to 100 nm) in crystallite size and an amorphous phase; and a grain boundary layer between the mixed-phase particles. Also, the iron alloy has a composition containing Fe, Si, P, B, C, and Cu.

2 Claims, 1 Drawing Sheet

Related U.S. Application Data continuation of application No. PCT/JP2018/045959, filed on Dec. 13, 2018.

(51) Int. Cl.

| | |
|---|---|
| ***B22F 1/08*** | (2022.01) |
| ***B22F 1/142*** | (2022.01) |
| ***C22C 38/00*** | (2006.01) |
| ***C22C 38/02*** | (2006.01) |
| ***C22C 38/16*** | (2006.01) |
| ***C22C 45/02*** | (2006.01) |
| ***H01F 1/153*** | (2006.01) |
| *B22F 1/07* | (2022.01) |

(52) U.S. Cl.

CPC ...... *C22C 2200/02* (2013.01); *C22C 2200/04* (2013.01); *C22C 2202/02* (2013.01)

(56) References Cited

FOREIGN PATENT DOCUMENTS

| | | | | |
|---|---|---|---|---|
| JP | 2008294411 | A | * | 12/2008 |
| JP | 2010-070852 | A | | 4/2010 |
| JP | 2013-055182 | A | | 3/2013 |
| JP | 2013-067863 | A | | 4/2013 |
| JP | 2013-138159 | A | | 7/2013 |
| JP | 2013-165251 | A | | 8/2013 |
| JP | 2014-060183 | A | | 4/2014 |
| JP | 2016-060956 | A | | 4/2016 |
| JP | 2016-104900 | A | | 6/2016 |
| WO | 2017/022594 | A1 | | 2/2017 |

OTHER PUBLICATIONS

Gheiratmand, J. Magnetism and Magnetic Materials. vol 381, p. 322-327. (Year: 2015).*

Adcock (Proceedings of the Royal Society of London. A. Mathematical and Physical Sciences, 1935, 153(878), p. 172-200) (Year: 1935).*

Abiko et al., "Effect of Phosphorus on Hot Ductility of High Purity Iron", Journal de Physique IV. Nov. 1995, pp. C7-335 through C7-340 and title page, URL: <http://hal.archives-ouvertes.fr/jpa-00254034/document> (Year: (1995).

Konno et al., JP2013055182A Google Machine Translation printed on Aug. 4, 2022, Mar. 21, 2013, entire translation (Year: 2013).

International Search Report issued in PCT/JP2018/045959; mailed Mar. 19, 2019.

International Preliminary Report on Patentability and Written Opinion issued in PCT/JP2018/045959; issued Sep. 29, 2020.

* cited by examiner

IRON ALLOY PARTICLE AND METHOD FOR PRODUCING IRON ALLOY PARTICLE

CROSS-REFERENCE TO RELATED APPLICATIONS

This application is a Divisional of U.S. patent application Ser. No. 17/017,478, filed Sep. 10, 2020, which claims benefit of priority to International Patent Application No. PCT/JP2018/045959, filed Dec. 13, 2018, and to Japanese Patent Application No. 2018-056447, filed Mar. 23, 2018, the entire contents of each are incorporated herein by reference.

BACKGROUND

Technical Field

The present disclosure relates to an iron alloy particle and a method for producing iron alloy particles.

Background Art

Conventionally, iron, silicon steel, and the like have been used as soft magnetic materials for use in various reactors, motors, transformers, and the like. These materials have high magnetic flux densities, but have high crystal magnetic anisotropy and thus have large hystereses. Thus, the magnetic parts obtained with the use of these materials have the problem of increasing the losses.

To address such a problem, Japanese Patent Application Laid-Open No. 2013-67863 discloses a soft magnetic alloy powder represented by composition formula: $Fe_{100-x-y}Cu_xB_y$ (in atomic %, $1<x<2$, $10\leq y\leq 20$), including a structure in which crystal particles that have a body-centered cubic structure, of 60 nm or less in average particle size, are dispersed in a volume fraction of 30% or more in an amorphous matrix.

SUMMARY

The disclosure in Japanese Patent Application Laid-Open No. 2013-67863 describes achieving the effect of having a high saturation magnetic flux density and excellent soft magnetic characteristics. The disclosure in Japanese Patent Application Laid-Open No. 2013-67863, however, has the problem of inadequate high frequency characteristics.

Accordingly, the present disclosure provides an iron alloy particle that has a high saturation magnetic flux density and favorable high frequency characteristics. The present disclosure also provides a method for producing the iron alloy particle.

The iron alloy particle according to the present disclosure is a particle including an iron alloy, the particle includes multiple mixed-phase particles, each including nanocrystals of 10 nm or more and 100 nm or less (i.e., from 10 nm to 100 nm) in crystallite size and an amorphous phase; and a grain boundary layer between the mixed-phase particles, and the iron alloy has a composition containing Fe, Si, P, B, C, and Cu.

In the iron alloy particle according to the present disclosure, the grain boundary layer preferably has a thickness of 200 nm or less.

The method for producing iron alloy particles according to the present disclosure includes the steps of applying a shearing process to an amorphous material including an iron alloy that has a composition containing Fe, Si, P, B, C, and Cu to plastically deform the amorphous material into particles and introduce a grain boundary layer into the particles; and applying a heat treatment to the particles with the grain boundary layer to deposit, in the particles, nanocrystals of 10 nm or more and 100 nm or less (i.e., from 10 nm to 100 nm) in crystallite size.

In the method for producing iron alloy particles according to the present disclosure, the shearing process is preferably performed with a high-speed rotary grinder, and a rotor of the high-speed rotary grinder preferably has a circumferential speed of 40 m/s or more.

In the method for producing iron alloy particles according to the present disclosure, the shearing process is preferably performed for an amorphous alloy ribbon including an iron alloy.

According to the present disclosure, an iron alloy particle can be provided which has a high saturation magnetic flux density and favorable high frequency characteristics.

DETAILED DESCRIPTION

An iron alloy particle according to the present disclosure will be described below. However, the present disclosure is not to be considered limited to the following configurations, but can be applied with changes appropriately made without changing the scope of the present disclosure. It is to be noted that the present disclosure also encompasses combinations of two or more individual desirable configurations according to the present disclosure as described below.

[Iron Alloy Particle]

Figure 1:
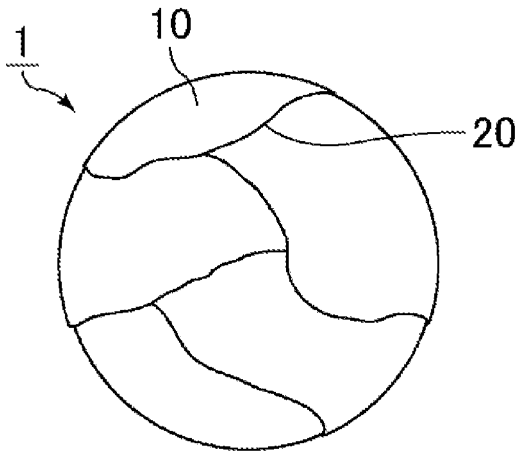
FIG. 1 is a sectional view schematically illustrating an example of an iron alloy particle according to the present disclosure.

FIG. 1 is a sectional view schematically illustrating an example of an iron alloy particle according to the present disclosure. The iron alloy particle 1 shown in FIG. 1 is a soft magnetic particle made of an iron alloy. The iron alloy particle 1 has one particle composed of multiple mixed-phase particles 10, with a grain boundary layer 20 between the mixed-phase particles 10.

Figure 2:
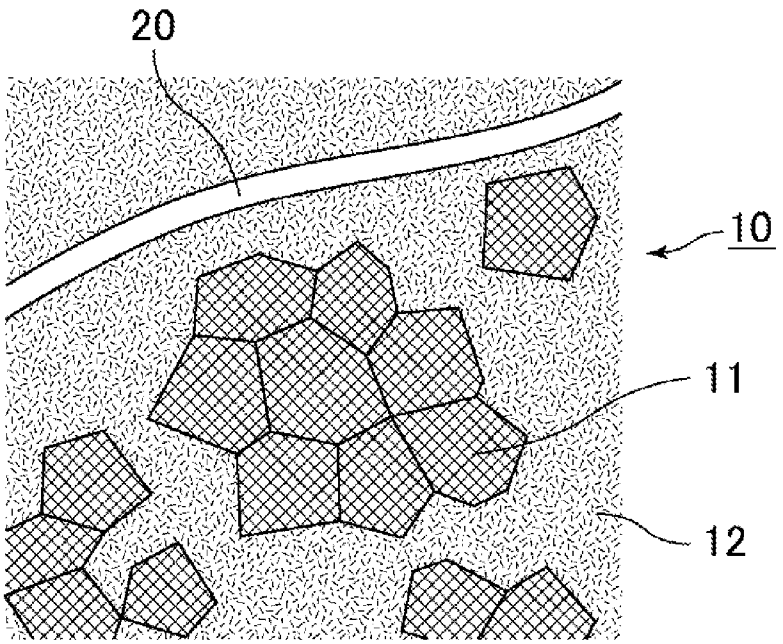
FIG. 2 is an enlarged view of a part of the iron alloy particle shown in FIG. 1.

FIG. 2 is an enlarged view of a part of the iron alloy particle shown in FIG. 1. As shown in FIG. 2, the mixed-phase particle 10 includes nanocrystals 11 and an amorphous phase 12, which have a periphery surrounded by the grain boundary layer 20. The nanocrystal 11 is a crystal particle that has a crystallite size of 10 nm or more and 100 nm or less (i.e., from 10 nm to 100 nm). The main phase of the mixed-phase particle 10 may be any of the nanocrystals 11 and the amorphous phase 12.

As shown in FIG. 2, there are also grain boundaries between the nanocrystals 11, but the iron alloy particle 1 shown in FIG. 1 has the grain boundary layer 20 that is different from the grain boundaries between the nanocrystals 11.

In the iron alloy particle according to the present disclosure, the phase state of the particle is the mixed phase including the nanocrystals and the amorphous phase, thus allowing the saturation magnetic flux density to be increased as compared with a case of only the amorphous phase.

The presence of nanocrystals in the mixed-phase particle can be confirmed by, for example, observing a section of the particle with the use of a transmission electron microscope (TEM) or the like. Similarly, the crystallite sizes of nanocrystals can be measured by section observation with the use of a TEM or the like. In contrast, the presence of amorphous phase in the mixed-phase particle can be confirmed, for example, from the X-ray diffraction pattern of the iron alloy particle.

In the iron alloy particle according to the present disclosure, the composition of the iron alloy contains Fe, Si, P, B, C, and Cu. Fe is a main element that is responsible for magnetism, and the proportion thereof is higher than 50 at %. Si, P, B, and C are elements that are responsible for the formation of the amorphous phase, and Cu is an element that contributes to nanocrystallization.

In the iron alloy particle according to the present disclosure, the composition of the iron alloy is preferably represented by $Fe_aB_bSi_cP_xC_yCu_z$, with 79≤a≤86 at %, 5≤b≤13 at %, 0<c≤8 at %, 1≤x≤8 at %, 0<y≤5 at %, 0.4≤z≤1.4 at %, and 0.08≤z/x≤0.8. b, c, and x more preferably meet 6≤b≤10 at %, 2≤c≤8 at %, and 2≤x≤5 at %. y, z, and z/x more preferably meet 0<y≤3 at %, 0.4≤z≤1.1 at %, and 0.08≤z/x≤0.55. It is to be noted that 3 at % or less of Fe may be substituted with one or more elements of Ti, Zr, Hf, Nb, Ta, Mo, W, Cr, Co, Ni, Al, Mn, Ag, Zn, Sn, As, Sb, Bi, Y, N, O, and rare earth elements.

When an amorphous alloy that has the composition of FeSiPBCCu is subjected to a heat treatment, crystallization proceeds in two stages. In the first stage, nanocrystals are deposited in the particle, and in the second stage, the remaining amorphous phase is crystallized. Accordingly, the measurement by differential scanning calorimetry (DSC) determines the first crystallization calorific value and the second crystallization calorific value, thereby allowing the rate of decrease in calorific value in the case where the state with the first crystallization calorific value of 0 is regarded 100% to be evaluated as a "deposition rate of nanocrystals".

Furthermore, in the iron alloy particle according to the present disclosure, high frequency characteristics can be improved by introducing the grain boundary layer into the particle. The reason is considered as follows.

The core loss Pcv, which is the loss of a coil or an inductor, is expressed by the following equation (1):

$$Pcv = Phv + Pev = \mathrm{Wh}\cdot f + A\cdot f^2\cdot d^2 / \rho \tag{1}$$

Pcv: core loss ($kW/m^3$)
Phv: hysteresis loss ($kW/m^3$)
Pev: eddy current loss ($kW/m^3$)
f: frequency (Hz)
Wh: hysteresis loss coefficient ($kW/m^3\cdot Hz$)
d: particle size (m)
p: intragranular electrical resistivity ($\Omega\cdot m$)
A: coefficient The eddy current loss Pev, which increases with the square of the frequency, is dominant for the loss at high frequencies. Thus, it is essential to lower the Pev in order to improve the high frequency characteristics. From the above-mentioned formula (1), the Pev is affected by the frequency, the particle size, and the intragranular electrical resistivity. According to the present disclosure, the introduction of the grain boundary layer into the particle can increase the intragranular electrical resistivity, and thus lower the Pev. As a result, the high frequency characteristics are considered improved.

The iron alloy particle according to the present disclosure has only to have at least one grain boundary layer in one particle. The presence of the grain boundary layer in the particle can be confirmed from, for example, the different contrast of a part corresponding to the mixed-phase particle surrounded by the grain boundary layer in the observation of a section of the particle with the use of a TEM or the like.

The grain boundary layer of the iron alloy particle according to the present disclosure is a layer made of an oxide containing a metal element included in the iron alloy and an oxygen element. Accordingly, the section of the particle is subjected to elemental mapping for oxygen, thereby making it possible to measure the thickness of the grain boundary layer.

In the iron alloy particle according to the present disclosure, the thickness of the grain boundary layer is increased, thereby allowing the intragranular electrical resistivity to be increased, but in contrast, the increased thickness of the grain boundary layer decreases the saturation magnetic flux density. This is because the high volume ratio of the non-magnetic oxide or the oxide with a low saturation magnetic flux density. Accordingly, the thickness of the grain boundary layer is preferably 200 nm or less, more preferably 50 nm or less, from the viewpoint of achieving a balance between the high frequency characteristics and the saturation magnetic flux density. Furthermore, the thickness of the grain boundary layer is preferably 1 nm or more, more preferably 10 nm or more. It is to be noted that the thickness of the grain boundary layer means, in the case of making a section observation in a defined field of view in the range of 1 μm×1 μm and measuring the thickness of the grain boundary layer at 10 or more points by a line segment method, the average value for the thickness of the grain boundary layer in the field of view.

The average particle size of the iron alloy particle according to the present disclosure is not particularly limited, but for example, preferably 0.1 μm or more and 100 μm or less (i.e., from 0.1 μm to 100 μm). It is to be noted that the average particle size means, in the case of making a section observation in a defined field of view in the range of 1 m×1 m and measuring the particle size of each particle at 10 or more points by a line segment method, the average particle size for the circle equivalent diameter of each particle present in the field of view.

[Method for Producing Iron Alloy Particle]

The method for producing iron alloy particles according to the present disclosure includes the steps of applying a shearing process to an amorphous material including an iron alloy that has a composition containing Fe, Si, P, B, C, and Cu to plastically deform the amorphous material into particles and introduce a grain boundary layer into the particles; and applying a heat treatment to the particles with the grain boundary layer to deposit, in the particles, nanocrystals of 10 nm or more and 100 nm or less (i.e., from 10 nm to 100 nm) in crystallite size.

In the method for producing iron alloy particles according to the present disclosure, the form of the amorphous material including the iron alloy is not particularly limited, and examples thereof include a ribbon shape, a fibrous shape, and a thick-plate shape. Above all, in the method for producing iron alloy particles according to the present disclosure, the shearing process is applied to an amorphous alloy ribbon made of an iron alloy.

The alloy ribbon is obtained as a long ribbon-shaped ribbon by melting an alloy containing Fe by means such as arc melting or high frequency induction melting to produce an alloy melt, and quenching the alloy melt. As a method for quenching the molten alloy, for example, a method such as a single roll quenching method is used.

In the method for producing iron alloy particles according to the present disclosure, the composition of the iron alloy contains Fe, Si, P, B, C, and Cu.

In the method for producing iron alloy particles according to the present disclosure, the composition of the iron alloy is preferably represented by $Fe_aB_bSi_cP_xC_yCu_z$, with 79≤a≤86 at %, 5≤b≤13 at %, 0<c≤8 at %, 1≤x≤8 at %, 0<y≤5 at %, 0.4≤z≤1.4 at %, and 0.08≤z/x≤0.8. b, c, and x more preferably meet 6≤b≤10 at %, 2≤c≤8 at %, and 2≤x≤5 at %. y, z, and z/x more preferably meet 0<y≤3 at %, 0.4≤z≤1.1 at %, and 0.08≤z/x≤0.55. It is to be noted that 3 at % or less of Fe may be substituted with one or more elements of Ti, Zr, Hf, Nb, Ta, Mo, W, Cr, Co, Ni, Al, Mn, Ag, Zn, Sn, As, Sb, Bi, Y, N, O, and rare earth elements.

In the method for producing iron alloy particles according to the present disclosure, the shearing process is preferably performed with the use of a high-speed rotary grinder. The high-speed rotary grinder is a device that rotates a hammer, a blade, a pin, or the like at high speed for grinding by shearing. Examples of such a high-speed rotary grinder include a hammer mill and a pin mill. Furthermore, the high-speed rotary grinder preferably has a mechanism that circulates particles.

In the process of shearing process with the use of the high-speed rotary grinder, a grain boundary layer can be introduced into the particles by plastic deforming and compounding the particles in addition to crushing the particles.

The circumferential speed of the rotor of the high-speed rotary grinder is preferably 40 m/s or more from the viewpoint of sufficiently introducing the grain boundary layer into the particles. The circumferential speed is, for example, preferably 150 m/s or less, more preferably 120 m/s or less.

In the method for producing iron alloy particles according to the present disclosure, the amorphous material including the iron alloy is preferably subjected to a heat treatment before the shearing process. This heat treatment allows an oxide layer for the grain boundary layer to be formed on the surface. The thickness of the grain boundary layer can be changed by changing the heat treatment conditions. In addition, the thickness of the grain boundary layer can also be changed by changing the temperature for the shearing process.

In the method for producing iron alloy particles according to the present disclosure, the thickness of the grain boundary layer in increased as the temperature of the heat treatment is increased. The temperature of the heat treatment is not particularly limited, but, for example, 80° C. or higher, and preferably lower than the first crystallization temperature.

In the method for producing iron alloy particles according to the present disclosure, the particles with a grain boundary layer is subjected to the heat treatment after the shearing process, thereby allowing nanocrystals to be deposited in the particles. The deposition rate of nanocrystals can be changed by changing the heat treatment conditions.

In the method for producing iron alloy particles according to the present disclosure, the temperature of the heat treatment for depositing the nanocrystals is not particularly limited, but preferably higher than the temperature of the heat treatment for forming the oxide layer, for example, preferably 500° C. or higher, and preferably lower than the first crystallization temperature.

EXAMPLES

Examples that more specifically disclose the iron alloy particle according to the present disclosure will be described below. It is to be noted that the present disclosure is not to be considered limited to only these examples.

[Preparation of Alloy Particle]

Example 1-1

As a raw material, an alloy ribbon with a composition of FeSiPBCCu, prepared by a single roll quenching method, was prepared. The composition used in the examples is $Fe_{84.8}Si_{0.5}B_{9.4}P_{3.5}Cu_{0.8}C_{1}$. This alloy ribbon was subjected to grinding with the use of a high-speed rotary grinder.

A hybridization system (NHS-0 type, manufactured by Nara Machinery Co., Ltd.) was used as the high-speed rotary grinder. Table 1 shows the processing time (rotor rotation time) and the circumferential speed (rotor rotation speed).

After the grinding, heat treatment was performed at 500° C. for 1 hour. According to the above-mentioned manner, alloy particles were prepared.

Example 1-2 to Example 1-8

Alloy particles were prepared by the same processing as in Example 1-1, except for changing the processing time and the circumferential speed to the values shown in Table 1.

Comparative Example 1-1 to Comparative Example 1-4

Alloy particles were prepared by the same processing as in Example 1-1, except for changing the processing time and the circumferential speed to the values shown in Table 1.

Comparative Example 1-5

Alloy particles were prepared by the same processing as in Example 1-1, except for grinding with the use of a high-speed collision-type grinder instead of the high-speed rotary grinder, and for changing the processing time to the values shown in Table 1. A jet mill (AS-100 type, manufactured by HOSOKAWA MICRON CORPORATION) was used as the high-speed collision-type grinder.

(Comparative Example 1-6 to Comparative Example 1-8) Alloy particles were prepared by the same processing as in Comparative Example 1-5, except for changing the processing time to the values shown in Table 1.

Comparative Example 1-9

Alloy particles were prepared by the same processing as in Example 1-1, except that the heat treatment after the grinding was not performed.

[Confirmation of Phase State]

For the alloy particles prepared in Example 1-1 to Example 1-8 and Comparative Example 1-1 to Comparative Example 1-9, the crystallinity was confirmed from the X-ray diffraction patterns. Furthermore, the alloy particles prepared in Example 1-1 to Example 1-8 and Comparative Example 1-1 to Comparative Example 1-9 were dispersed in a silicone resin, thermally cured, and then polished at sections. The TEM observation of the sections of the obtained alloy particles confirmed whether nanocrystals of 10 nm or more and 100 nm or less (i.e., from 10 nm to 100 nm) in crystallite size were deposited or not. Table 1 shows the phase state of each alloy particle.

[Presence or Absence of Grain Boundary Layer]

The TEM observation of the sections of the alloy particles obtained as mentioned above confirmed whether any grain boundary layer was present or not in the particles. Table 1 shows the presence or absence of the grain boundary layer.

[Saturation Magnetic Flux Density]

For the alloy particles prepared in Example 1-1 to Example 1-8 and Comparative Example 1-1 to Example 1-9, the saturation magnetic flux density was measured with the use of a vibrating sample magnetometer (VSM device). The results are shown in Table 1.

[Intragranular Electrical Resistivity]

For the sections of the alloy particles obtained above, the intragranular electrical resistivity was measured by a four terminal method. The results are shown in Table 1.

[Eddy Current Loss]

The eddy current loss was calculated from the intragranular electrical resistivity measured as mentioned above. Based on the formula (1) mentioned above, Pcv was measured, and based on the same formula, Phv and Pev were calculated. The measurement conditions were: Bm=40 mT; and f=0.1 to 1 MHz, and for the measuring instrument, a B-H analyzer SY8218 manufactured by IWATSU ELECTRIC CO., LTD. was used. The results are shown in Table 1.

TABLE 1

| | Raw Material | Grinder | Processing Time (s) | Circumferential Speed (m/s) | Grain Boundary Layer | Saturation Magnetic Flux Density (T) | Intragranular Electrical Resistivity (μΩ · cm) | Eddy Current Loss 40 mT-1 MHz (kW/m$^3$) | Phase State |
|---|---|---|---|---|---|---|---|---|---|
| Example 1-1 | FeSiPBCCu Ribbon | High-Speed Rotary Type | 180 | 40 | Yes | 1.70 | 130 | 3643 | Amorphous + Nanocrystal |
| Example 1-2 | FeSiPBCCu Ribbon | High-Speed Rotary Type | 300 | 40 | Yes | 1.70 | 160 | 3137 | Amorphous + Nanocrystal |
| Example 1-3 | FeSiPBCCu Ribbon | High-Speed Rotary Type | 600 | 40 | Yes | 1.70 | 180 | 2788 | Amorphous + Nanocrystal |
| Example 1-4 | FeSiPBCCu Ribbon | High-Speed Rotary Type | 900 | 40 | Yes | 1.70 | 200 | 2192 | Amorphous + Nanocrystal |
| Example 1-5 | FeSiPBCCu Ribbon | High-Speed Rotary Type | 1800 | 40 | Yes | 1.70 | 220 | 2563 | Amorphous + Nanocrystal |
| Example 1-6 | FeSiPBCCu Ribbon | High-Speed Rotary Type | 60 | 80 | Yes | 1.70 | 150 | 3854 | Amorphous + Nanocrystal |
| Example 1-7 | FeSiPBCCu Ribbon | High-Speed Rotary Type | 180 | 80 | Yes | 1.70 | 220 | 2567 | Amorphous + Nanocrystal |
| Example 1-8 | FeSiPBCCu Ribbon | High-Speed Rotary Type | 300 | 30 | Yes | 1.70 | 120 | 3926 | Amorphous + Nanocrystal |
| Comparative Example 1-1 | FeSiPBCCu Ribbon | High-Speed Rotary Type | 5 | 40 | No | 1.70 | 100 | 5382 | Amorphous + Nanocrystal |
| Comparative Example 1-2 | FeSiPBCCu Ribbon | High-Speed Rotary Type | 30 | 40 | No | 1.70 | 100 | 4965 | Amorphous + Nanocrystal |
| Comparative Example 1-3 | FeSiPBCCu Ribbon | High-Speed Rotary Type | 60 | 40 | No | 1.70 | 100 | 4726 | Amorphous + Nanocrystal |
| Comparative Example 1-4 | FeSiPBCCu Ribbon | High-Speed Rotary Type | 30 | 80 | No | 1.70 | 100 | 4275 | Amorphous + Nanocrystal |
| Comparative Example 1-5 | FeSiPBCCu Ribbon | High-Speed Collision-Type | 60 | — | No | 1.70 | 100 | 5382 | Amorphous + Nanocrystal |
| Comparative Example 1-6 | FeSiPBCCu Ribbon | High-Speed Collision-Type | 600 | — | No | 1.70 | 100 | 4894 | Amorphous + Nanocrystal |
| Comparative Example 1-7 | FeSiPBCCu Ribbon | High-Speed Collision-Type | 1800 | — | No | 1.70 | 100 | 4430 | Amorphous + Nanocrystal |
| Comparative Example 1-8 | FeSiPBCCu Ribbon | High-Speed Collision-Type | 180 | — | No | 1.70 | 100 | 4912 | Amorphous + Nanocrystal |
| Comparative Example 1-9 | FeSiPBCCu Ribbon | High-Speed Rotary Type | 180 | 40 | Yes | 1.65 | 110 | 4061 | Amorphous |

In Example 1-1 to Example 1-8, the particles include nanocrystals in addition to an amorphous phase. Accordingly, higher saturation magnetic flux densities are achieved as compared with Comparative Example 1-9 including no nanocrystals in the particles.

Moreover, in Example 1-1 to Example 1-8, the grain boundary layer is introduced into the particles by the grinding with the use of the high-speed rotary grinder. As a result, the intragranular electrical resistivity is increased to decrease eddy current loss, thus achieving the effect of improving the high frequency characteristics.

In contrast, Comparative Example 1-1 to Comparative Example 1-8, without the grain boundary layer introduced into the particles, fails to achieve the effect of improving the high frequency characteristics. As in Comparative Example 1-1 to Comparative Example 1-4, even in the case of using the high-speed rotary grinder, no grain boundary layer is considered introduced into the particles if the processing time is short. Moreover, as in Comparative Example 1-5 to Comparative Example 1-8, in the case of using a high-speed collision-type grinder, grinding by chipping occurs, but the grain boundary layer is considered to fail to be introduced into the particles.

[Preparation of Alloy Particle]

Example 2-1

As in Example 1-1, an alloy ribbon with a composition of FeSiPBCCu, prepared by a single roll quenching method, was prepared as a raw material. The alloy ribbon was subjected to a heat treatment under the conditions shown in Table 2, and then the same processing as in Example 1-1 to prepare alloy particles.

Example 2-2 to Example 2-8

Alloy particles were prepared by the same processing as in Example 2-1, except for changing the conditions of the heat treatment for the alloy ribbons to the values shown in Table 2.

[Confirmation of Phase State]

The phase states of the alloy particles prepared in Example 2-1 to Example 2-8 were confirmed by the same method as in Example 1-1. Table 2 shows the deposition rate of the phase state for each alloy particle.

[Thickness of Grain Boundary Layer]

Furthermore, the alloy particles prepared in Example 2-1 to Example 2-8 were dispersed in a silicone resin, thermally cured, and then polished at sections. The obtained sections of the alloy particles were subjected to TEM observation and elemental mapping for oxygen, thereby measuring the thickness of the grain boundary layer. The results are shown in Table 2.

[Saturation Magnetic Flux Density]

For the alloy particles prepared in Example 2-1 to Example 2-8, the saturation magnetic flux density was measured by the same method as in Example 1-1. The results are shown in Table 2.

[Intragranular Electrical Resistivity]

For the alloy particles prepared in Example 2-1 to Example 2-8, the intragranular electrical resistivity was measured by the same method as in Example 1-1. The results are shown in Table 2.

TABLE 2

| | Raw Material | Grinder | Heat Treatment Temperature (° C.) | Heat Treatment Time (s) | Grain Boundary Layer Thickness (nm) | Saturation Magnetic Flux Density (T) | Intragranular Electrical Resistivity (μΩ · cm) | Phase State |
|---|---|---|---|---|---|---|---|---|
| Example 2-1 | FeSiPBCCu Ribbon | High-Speed Rotary Type | 100 | 10 | 1 | 1.70 | 115 | Amorphous + Nanocrystal |
| Example 2-2 | FeSiPBCCu Ribbon | High-Speed Rotary Type | 200 | 30 | 5 | 1.70 | 125 | Amorphous + Nanocrystal |
| Example 2-3 | FeSiPBCCu Ribbon | High-Speed Rotary Type | 200 | 60 | 10 | 1.70 | 125 | Amorphous + Nanocrystal |
| Example 2-4 | FeSiPBCCu Ribbon | High-Speed Rotary Type | 200 | 600 | 50 | 1.65 | 160 | Amorphous + Nanocrystal |
| Example 2-5 | FeSiPBCCu Ribbon | High-Speed Rotary Type | 250 | 600 | 100 | 1.60 | 210 | Amorphous + Nanocrystal |
| Example 2-6 | FeSiPBCCu Ribbon | High-Speed Rotary Type | 300 | 600 | 200 | 1.50 | 300 | Amorphous + Nanocrystal |
| Example 2-7 | FeSiPBCCu Ribbon | High-Speed Rotary Type | 350 | 600 | 300 | 1.40 | 420 | Amorphous + Nanocrystal |
| Example 2-8 | FeSiPBCCu Ribbon | High-Speed Rotary Type | 425 | 600 | 500 | 1.35 | 580 | Amorphous + Nanocrystal |

The thickness of the oxide layer at the surface can be changed by changing the heat treatment conditions for the alloy ribbon. Specifically, as the heat treatment temperature and the heat treatment time are respectively higher and longer, the thickness of the oxide layer is increased. The thickness of the grain boundary layer corresponds to the thickness of the oxide layer, and thus, as shown in Table 2, the thickness of the grain boundary layer can be changed by changing the conditions of heat treatment for the alloy ribbon.

From the results of Example 2-1 to Example 2-8, the intragranular electrical resistivity can be increased by increasing the thickness of the grain boundary layer, whereas the increased thickness of the grain boundary layer decreases the saturation magnetic flux density. From Table 2, the thickness of the grain boundary layer is adjusted to 200 nm or less, thereby making it possible to achieve the high intragranular electrical resistivity and saturation magnetic flux density.

[Preparation of Alloy Particle or Metal Particle]

Comparative Example 3-1 and Comparative Example 3-2

As a raw material, an alloy ribbon with a composition of FeSiB, prepared by a single roll quenching method, was prepared, and subjected to the same processing as in Example 1-1 under the conditions shown in Table 3, thereby preparing alloy particles.

Comparative Example 3-3 to Comparative Example 3-5

As a raw material, an alloy ribbon with a composition of FeSi, prepared by a single roll quenching method, was prepared, and subjected to the same processing as in Example 1-1 under the conditions shown in Table 3, thereby preparing alloy particles.

Comparative Example 3-6 to Comparative Example 3-8

As a raw material, a metal ribbon with a composition of Fe, prepared by a single roll quenching method, was prepared, and subjected to the same processing as in Example 1-1 under the conditions shown in Table 3, thereby preparing metal particles.

Comparative Example 3-9

As a raw material, an alloy ribbon with a composition of FeSiB, prepared by a single roll quenching method, was prepared, and subjected to the same processing as in Comparative Example 1-7 under the conditions shown in Table 3, thereby preparing alloy particles.

The alloy particles or metal particles prepared in Comparative Example 3-1 to Comparative Example 3-9 were evaluated in the same manner as in Example 1-1. The results are shown in Table 3.

TABLE 3

| | Composition | Grinder | Processing Time (s) | Circumferential Speed (m/s) | Grain Boundary Layer | Saturation Magnetic Flux Density (T) | Intragranular Electrical Resistivity (μΩ · cm) | Eddy Current Loss 40 mT-1 MHz ($kW/m^3$) | Phase State |
|---|---|---|---|---|---|---|---|---|---|
| Example 1-1 | FeSiPBCCu | High-Speed Rotary Type | 180 | 40 | Yes | 1.70 | 130 | 3643 | Amorphous + Nanocrystal |
| Example 1-2 | FeSiPBCCu | High-Speed Rotary Type | 300 | 40 | Yes | 1.70 | 160 | 3137 | Amorphous + Nanocrystal |
| Example 1-3 | FeSiPBCCu | High-Speed Rotary Type | 600 | 40 | Yes | 1.70 | 180 | 2788 | Amorphous + Nanocrystal |

TABLE 3-continued

| | Composition | Grinder | Processing Time (s) | Circumferential Speed (m/s) | Grain Boundary Layer | Saturation Magnetic Flux Density (T) | Intragranular Electrical Resistivity (μΩ · cm) | Eddy Current Loss 40 mT-1 MHz (kW/m$^3$) | Phase State |
|---|---|---|---|---|---|---|---|---|---|
| Comparative Example 3-1 | FeSiB | High-Speed Rotary Type | 180 | 40 | Yes | 1.25 | 120 | 3984 | Amorphous |
| Comparative Example 3-2 | FeSiB | High-Speed Rotary Type | 5 | 40 | No | 1.25 | 100 | 4583 | Amorphous |
| Comparative Example 3-3 | FeSi | High-Speed Rotary Type | 5 | 40 | Yes | 1.90 | 30 | 5231 | Crystalline |
| Comparative Example 3-4 | FeSi | High-Speed Rotary Type | 180 | 40 | Yes | 1.90 | 40 | 4962 | Crystalline |
| Comparative Example 3-5 | FeSi | High-Speed Rotary Type | 300 | 40 | Yes | 1.90 | 60 | 4785 | Crystalline |
| Comparative Example 3-6 | Fe | High-Speed Rotary Type | 5 | 40 | Yes | 2.10 | 10 | 6926 | Crystalline |
| Comparative Example 3-7 | Fe | High-Speed Rotary Type | 180 | 40 | Yes | 2.10 | 30 | 5391 | Crystalline |
| Comparative Example 3-8 | Fe | High-Speed Rotary Type | 300 | 40 | Yes | 2.10 | 50 | 5207 | Crystalline |
| Comparative Example 3-9 | FeSiB | High-Speed Collision-Type | 1800 | — | No | 1.25 | 100 | 4400 | Amorphous |

From Table 3, Comparative Example 3-1 with the iron alloy composition of FeSiB allows amorphous alloy particles, but without nanocrystals deposited, fails to achieve a high saturation magnetic flux density. Furthermore, Comparative Example 3-2 and Comparative Example 3-9, without the grain boundary layer introduced into the particles, fail to increase the intragranular electrical resistivity, thereby increasing the eddy current loss.

Comparative Example 3-3 to Comparative Example 3-5 with the iron alloy composition of FeSi and Comparative Example 3-6 to Comparative Example 3-8 without any iron alloy, because of the crystalline alloy particles or the metal particles, fail to increase the intragranular electrical resistivity, thereby increasing the eddy current loss.

What is claimed is:

1. A method for producing iron alloy particles, comprising:

applying a shearing process to an amorphous material comprising an iron alloy that includes Fe, Si, P, B, C, and Cu to plastically deform the amorphous material into particles and introduce a grain boundary layer into the particles; and applying a heat treatment to the particles with the grain boundary layer to precipitate, in the particles, nanocrystals of from 10 nm to 100 nm in crystallite size, wherein the shearing process is performed with a high-speed rotary grinder, and a rotor of the high-speed rotary grinder has a circumferential speed of 40 m/s or greater.

2. The method for producing iron alloy particles according to claim 1, wherein the shearing process is performed on an amorphous alloy ribbon comprising the iron alloy.

* * * * *